United States Patent Office 3,535,403
Patented Oct. 20, 1970

3,535,403
COMPOSITION OF POLYMERIZED UNSATURATED COMPOUNDS AND REACTION PRODUCTS OF EPOXY RESINS AND MONOCARBOXYLIC ACIDS
Fred F. Holub, Scotia, and Milton L. Evans, Schenectady, N.Y., assignors to General Electric Company, a corporation of New York
No Drawing. Filed Jan. 19, 1968, Ser. No. 699,059
Int. Cl. C08g 45/04
U.S. Cl. 260—837     25 Claims

ABSTRACT OF THE DISCLOSURE

This invention relates to curable vinyl polymer compositions. More particularly, it relates to a curable composition comprising, on a weight basis, 100 parts of a vinyl polymer and 0.1 to 50 parts of the reaction product of an unsaturated monocarboxylic acid and an epoxy resin. The composition is useful in forming laminates.

---

A number of thermoplastic polymers have desirable properties but generally their use is limited because of inadequate tensile properties, especially at elevated temperatures or unsatisfactory adhesion to substrates. Polyethylene, for example, is chemically inert and therefore a good insulator. It is used extensively as insulation for electrical conductors either directly on the conductor or as an outer covering for already insulated conductors. Many applications for conductors insulated with polyethylene are satisfied by the use of the thermoplastic polymer. However, there are a number of applications where strength at elevated temperatures is a requirement which conventional polyethylene cannot satisfy. This is due to the fact that conventional polyethylene begins to soften and readily deform under load usually in the range of 80–125° C., thereby exposing the conductor to the danger of short-circuits. Although crosslinking of the polyethylene has been known to raise its fusion point, the crosslinked polymer often has relatively unsatisfactory tensile properties at elevated temperatures.

The cured compositions of the present invention have improved tensile characteristics. In addition, the instant cured compositions are tough, flexible, thermo-setting materials which display good adhesion to substrates. Many of these compositions have good tensile properties at elevated temperatures. They are particularly useful as insulators, sealants, coatings or adhesives and in forming laminates.

The vinyl polymers used in the present invention are commercially available. They are formed from ethylene and its derivatives possessing a methylene group linked by a double bond to another carbon atom having the structural formula $CH_2{:}C{<}$. Representative of the instant vinyl polymers, in addition to polyethylene, are polyvinyl chloride, polyvinylidene chloride, polypropylene, polyvinyl acetate, polyisobutylene, polystyrene, etc. Vinyl copolymers can be used as well as copolymers wherein at least 50 percent of the copolymer is comprised of a copolymerized vinyl monomer. Examples of these are copolymers of ethylene and propylene, ethylene, propylene and butylene, etc. The instant vinyl polymer is usually solid in form but it can be a liquid depending upon the particular composition properties desired.

Blends of vinyl polymers can be used in the present invention. Such blends may comprise a vinyl polymer blended with a second vinyl polymer or with another polymer. For most applications, these blends comprise 20–95% by weight of the vinyl polymer and from 5–80% by weight of the second vinyl polymer or other polymer based on the total amount of polymer blend present. In particular, it has been found that the use of polyethylene blended with polyvinyl chloride in the present composition improves the compatibility of the two polymers and results in a composition with unexpectedly good properties.

The reaction product component of the instant composition is formed by reacting an unsaturated monocarboxylic acid with an epoxy resin in any conventional manner. One method is to heat a mixture of the epoxy resin and acid to reaction temperature in the presence of a basic catalyst for a time sufficient to complete the reaction. Typical examples of a basic catalyst are pyridine, tertiary amines, and the hydroxides of potassium and sodium. Reaction time and temperature depend upon the particular acid and epoxy resin. The reaction should be carried out until substantially all of the acid has been reacted with the epoxy resin. For example, 300 parts of methacrylic acid and 500 parts of "Epon 828," an epoxy resin formed from epichlorohydrin and 2,2-bis-(p - hydroxyphenyl) propane known as "Bisphenol-A," having an epoxy equivalent of 185–192, can be reacted in the presence of 0.5 part pyridine at a temperature of 80° C. in about 1 hour. The instant epoxy resin is prepared from polyfunctional halohydrins such as epichlorohydrin and phenol or polyhydric phenols. These resins are well known and commercially available. Typical phenols useful in the preparation of the resin are resorcinol and various bisphenols resulting from the condensation of phenol with aldehydes and ketones such as formaldehyde, acetaldehyde, and acetone. Representative of the bisphenols is 2,2-bis(p - hydroxyphenyl) propane (known as Bisphenol-A); 4,4'-dihydroxydiphenylsulfone; 4,4'-dihydroxy biphenyl, 4,4'-dihydroxydiphenylmethane; 2,2'-dihydroxydiphenyloxide, etc.

The epoxy resin useful for most applications in forming the reaction product used in the practice of the present invention corresponds to the general formula

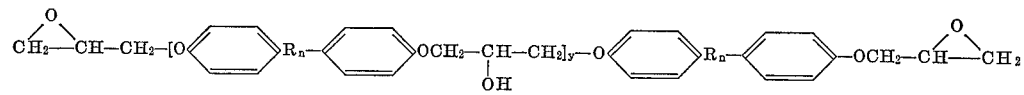

where R is a divalent radical selected from the group consisting of saturated alkylene radicals of from 1 to 8 carbon atoms, oxygen, and the sulfone group, y is 0 or an integer having a value up to 25 and n is 0 or 1. Specifically, R may be methylene, ethylene, propylene, isopropylene, isopropylidene, butylene, isobutylene, etc.

The most common epoxy resin of this type is the reaction product of epichlorohydrin and Bisphenol-A which corresponds to the structural formula

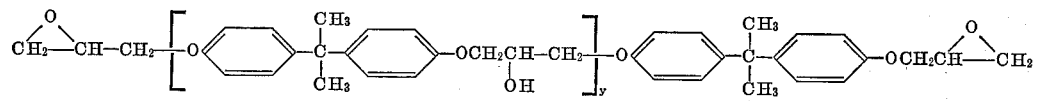

where y has the meaning given above.

The instant epoxy resin may also be an epoxy novolac resin. These resins are commercially available and correspond to the formula

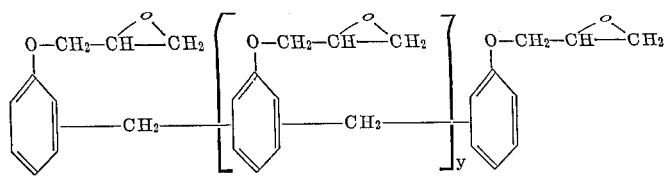

where $y$ has the value given above.

An epoxy resin which is formed from tetraphenylol ethane and epichlorohydrin is also suitable and corresponds to the formula

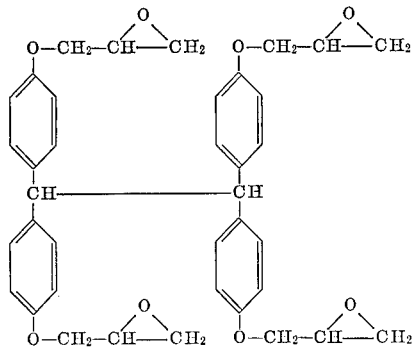

Epoxy resins which are epoxidized olefins can also be used in the present invention. An example of one such resin is a dicyclohexane diepoxide carboxylate which has the formula

$$O(C_6H_8)(CH_3)CH_2OCO(C_6H_8)(CH_3)O$$

Other examples include vinyl cyclohexene dioxide and dipentene dioxide.

The instant epoxy resin may be liquid or solid. It generally has an epoxy equivalent in the range of 100 to 4000 and preferably from 150 to 450. The epoxy equivalent weight is the weight of resin in grams which contain one grain equivalent of epoxy.

Any monocarboxylic unsaturated acid can be used to form the reaction product component. A suitable acid corresponds to the formula

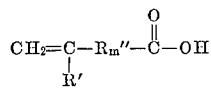

where $R'$ is a monovalent radical selected from the group consisting of hydrogen, an alkyl radical of from 1 to 8 carbon atoms, a halogen atom and an aromatic radical, $R''$ is a divalent saturated aliphatic hydrocarbon radical of from 1 to 3 carbon atoms and $m$ is 0 or 1. $R'$, for example, may be methyl, ethyl, propyl, phenyl, chloro, etc. Typical examples of $R''$ include methylene, ethylene, etc. Representative of these acids are acrylic acid, methacrylic acid, α-phenylacrylic acid, α-chloroacrylic acid, vinyl acetic acid, etc.

The amount of acid used to react with the epoxy resin depends on whether all the epoxy groups of the resin are to be reacted. If substantially complete reaction is desired, substantially stoichiometric amounts of the unsaturated acid and epoxy resin should be used. However, when it is desired to retain some epoxy groups in the reaction product as additional reaction sites, the acid should be used in less than stoichiometric amount, i.e. generally not less than about 50 percent of the stoichiometric amount.

Although the reaction of the unsaturated acid with the epoxy resin is complex and not well understood; it is believed that the acid reacts with the epoxy group of the resin to form a secondary hydroxyl group. The acid also introduces unsaturation sites in the reaction product. In simplified form, using only the epoxy group for reference, it may be presented as follows

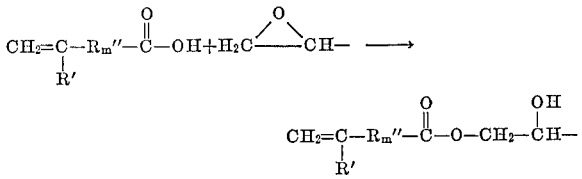

where $R'$, $R''$ and $m$ have the meanings above.

The amount of reaction product used in the instant composition can vary widely depending on the particular results desired. Compositions containing the reaction product in amounts from 0.1 to 50 percent, by weight, of the vinyl polymer are useful. Amounts of the reaction product ranging from 0.5 to 10 percent, by weight, of the vinyl polymer are satisfactory for most applications.

To prepare the curable composition, any conventional technique can be used to produce a good mixture of the vinyl polymer and the reaction product of the unsaturated acid and epoxy resin. For example, the components can be admixed by hot milling on a mill or a Banbury mixer. If the free radical source is an organic peroxide, it can be milled with the other components at the same time.

The composition is then shaped by any conventional method to the desired form before curing. The shaped composition is cured by a free radical mechanism, and any source of free radicals can be used. For example, an organic peroxide can be used as well as high energy ionizing radiation.

It is believed that the free radicals react with the unsaturated ester portions of the reaction product to graft the reaction product to the vinyl polymer. This results in a three-dimensional gel network which converts the composition to a thermosetting material. The secondary hydroxyl groups and residual epoxide group present in the cured composition are believed to enhance the adhesiveness of the composition to a substrate. To cure a shaped composition containing an organic peroxide, it need only be heated to the decomposition temperature of the peroxide for a period of time sufficient to decompose the peroxide.

The shaped composition containing no source of free radicals can also be cured by subjecting it to ionizing radiation. Any conventional source of ionizing radiation can be used. The various types of ionizing radiation and apparatus suitable for supplying the high energy ionizing radiation, for instance, high energy electrons, is more particularly described in Lawton et al. U.S. Pat. No. 2,997,418, issued Aug. 22, 1961, and assigned to the same assignee as the present invention. By reference this patent is made part of the disclosures of the instant application. In general the energy of electrons employed in the practice of this invention may range from about 50,000 electron volts to 20,000,000 electron volts or higher depending upon the kind of materials being irradiated. The dosage at which measurable infusibility and insolubility of the composition can be induced in the irradiated material generally ranges from $1 \times 10^6$ rep up to as high as $1 \times 10^8$ rep.

The shaped composition containing no source of free radicals can also be cured by heating it in air. In this instance atmospheric oxygen provides the free radicals which effect a cure of the composition.

Representative of the organic peroxide which can be used as a source of free radicals in the instant composition is di-(α-cumyl) peroxide [or bis(α,α-dimethylbenzyl) peroxide as it is also known]. Organic peroxides having a decomposition point in excess of about 100° C. are preferred in order to minimize loss of effective peroxide content when elevated milling temperatures are employed. A class of peroxides which is especially effective in causing the desired crosslinking and attainment of a cured product of improved properties are di(aralkyl) peroxides of the formula

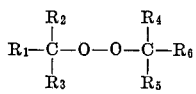

where $R_1$ is aralkyl, $R_2$, $R_3$, $R_4$, and $R_5$ are hydrogen or alkyl groups with less than 4 carbon atoms, and R is aralkyl. $R_2$, $R_3$, $R_4$, and $R_5$ may all be the same or each may be a different group or any two or more may be the same or different. Similarly, $R_1$ and $R_6$ may be the same or different aralkyl groups. Among such peroxides may be mentioned, for instance, dibenzyl peroxide, bis(α-methylbenzyl) peroxide, bis-(α-ethylbenzyl) peroxide, bis-(α-propylbenzyl) peroxide, bis - (α,α - dimethyl - p - isopropylbenzyl) peroxide, bis - (α,α - dimethyl - p - methylbenzyl) peroxide, etc. Additional examples of the groupings which $R_1$, $R_2$, $R_3$, $R_4$ and $R_5$ may represent and examples of other peroxides within the scope of the above peroxide formula may be found disclosed in U.S. Pat. 2,826,570, issued Mar. 11, 1958.

The amount of organic peroxide component used in the instant composition may be varied widely. Generally, the peroxide can be used in an amount of about 0.1 to 10 percent by weight of the vinyl polymer component with amounts of 0.1 to about 5 percent, by weight, being preferred. Amounts of peroxide in excess of 10 percent generally cause evolution of volatile materials which may weaken adherence to substrates.

Filler, pigments and dyes can be used in the instant composition. The fillers may be in the form of particles or fibers. Typical fillers are ground ceramics, titanium dioxide, silica, mica, treated clays, carbon black, calcium carbonate, fibrous magnesium silicate, quartz, kryolite, portland cement and metal powders such as iron powder, aluminum powder and copper powder. The amount of filler used depends upon the particular composition properties desired. Filler in amounts up to about 200 percent, by weight, of the vinyl polymer is satisfactory for most applications.

In the compounding of the present compositions for various uses, there may be included pigments and other modifying materials which do not have a significant detrimental effect on the properties of the cured composition such as antioxidants, heat stabilizers and lubricants. The compounding and heat-curing of the compositions can be varied widely. Thus, the curing temperatures may vary from 125 to 250° C. for times of the order of 1 minute to 2 hours or more. Molding pressures of from 5 p.s.i. to 5000 p.s.i. or more may be used. Any conventional molding means such as compression molding, extrusion, injection, etc., may be employed.

The cured composition of the present invention can be used in various applications particularly where resistance to elevated temperatures is a requirement. In addition to insulating electrical conductors, for instance, copper conductors, aluminum conductors, alloys of copper and aluminum, etc., bus bars can also be insulated. These compositions can be used for encapsulating purposes by molding the instant composition around various electrical apparatus which requires resistance to heat. The heat stability of these compositions makes them useful for packaging purposes or for use as thermal insulators. The good adhesiveness to various substrates of the present cured compositions makes them especially useful in the production of laminates.

In order that those skilled in the art may better understand how the present invention may be practiced, the following examples are given by way of illustration and not by way of limitation. All parts used herein are by weight unless otherwise stated.

The peel strength in the following examples illustrates bond strength and was carried out as follows: Aluminum sheet 1/16″ thick was treated to remove foreign matter from its laminating surface by blasting the surface with sand grit, removing any grease with an acetone wash, washing with water to remove the excess grit, and drying it. A laminate was prepared by interposing the polymer sample between the cleaned surfaces of two sheets of the aluminum, placing the assembly in a press which had present 1/8″ spacers in order to prepare a laminate of about 1/4″ thickness. The laminate was pressed at 155° C. for 30 minutes at approximately 1000 p.s.i. The actual peel strengths were measured by cutting out one-inch wide strips from the laminate, peeling back (insofar as possible) about 1½″ of the aluminum on one side of the polymer sample to a point 180° from the remainder of the laminate, inserting a portion of the peeled aluminum end of the remainder of the laminate in opposite jaws of an Instron tester, and then observing the strength of the bond expressed as pounds/inch of width after half of the sample had been separated by the tester starting with the initial 1½″ peel.

In the following tabulated samples Nos. 1–31, a liquid reaction product was used which is available commercially under the trademark "Epocryl E11." This product is formed by reacting methacrylic acid with an epoxy resin "Epon 828." "Epon 828" is a liquid resin formed from the reaction of epichlorohydrin and Bisphenol A, and has an epoxide equivalent of 185–192 and an average molecular weight of 380. Epocryl E11 is believed to have the following formula

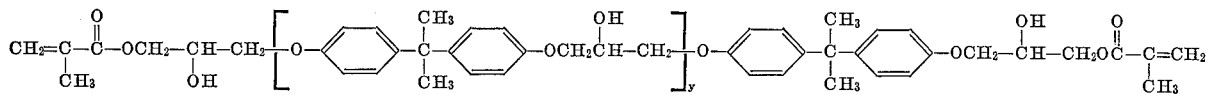

where $y=0.15$.

The components forming each sample of Table I were milled at 120° C. until a thorough mixture was obtained, generally about 10 to 20 minutes. The hot mixture was placed between two sheets of aluminum foil which were precoated with a release agent. The resulting composite was placed in a press and cured at 155° C. for 30 minutes under a pressure of 1000 p.s.i. The spacers in the press were set to produce a 30 mil thick film sample. After cooling to room temperature, the cured composition was removed and its tensile properties were determined.

TABLE I

| | Sample number (parts by weight) | | | | | |
|---|---|---|---|---|---|---|
| | 1 | 2 | 3 | 4 | 5 | 6 |
| Polyethylene ("Alathon 10," 22,000 mol. wt., 0.923 density at 25° C.) | 20 | 20 | 20 | 20 | 20 | 20 |
| Titanium dioxide (pigment grade) | 20 | 20 | 20 | 20 | 20 | 20 |
| "Epocryl E11" (methacrylic acid/epoxy resin "Epon 828" reaction product) | | 1 | | 2 | 1 | 2 |
| Di-(α-cumyl) peroxide | | | 0.4 | | 0.4 | 0.4 |
| Properties at 25° C.: | | | | | | |
| Tensile strength, p.s.i. | 2060 | 1820 | 1510 | 1867 | 2820 | 2760 |
| Elongation, percent | 33 | 30 | 93 | 25 | 203 | 200 |
| Properties at 100° C.: | | | | | | |
| Tensile strength, p.s.i. | 323 | 294 | 829 | 319 | 1224 | 1162 |
| Elongation, percent | 88 | 30 | 513 | 20 | 259 | |
| Peel strength, lbs./inch width | | 2 | 2 | | 12 | |

Sample Nos. 5 and 6 of Table I clearly illustrate the significantly better tensile properties of the cured composition of the present invention, especially at elevated temperatures. Sample No. 5 also shows the improved adhesion obtained by the instant composition.

The samples in Tables II and III were prepared and cured in the same manner as set forth in Table I. The components used in preparing the samples of Tables II and III were the same as that of Table I except that a polyethylene of a different molecular weight and density was used.

TABLE II

|  | Sample number (parts by weight) | | | |
| --- | --- | --- | --- | --- |
|  | 7 | 8 | 9 | 10 |
| Polyethylene ("Epolene C13," 10,000 mol. wt., 0.912 density at 25° C.) | 100 | 100 | 100 | 100 |
| Titanium dioxide (pigment grade) | 100 | 100 | 100 | 100 |
| Epocryl E11 (methacrylic acid/epoxy resin "Epon 828" reaction product) |  | 5 |  | 5 |
| Di-(α-cumyl) peroxide |  |  | 2 | 2 |
| Properties at 25° C.: |  |  |  |  |
| Tensile strength, p.s.i. | 1360 | 1040 | 1350 | 1750 |
| Elongation, percent | 25 | 25 | 30 | 145 |
| Properties at 100° C.: |  |  |  |  |
| Tensile strength, p.s.i. | 4 | 2 | 4 | 370 |
| Elongation, percent | 25 | 35 | 50 | 250 |
| Peel strength, lbs./inch width | <1 | <1 | 3 | 15 |

TABLE III

|  | Sample number (parts by weight) | | | |
| --- | --- | --- | --- | --- |
|  | 11 | 12 | 13 | 14 |
| Polyethylene ("Epolene C10," 7000 mol. wt., 0.908 density at 25° C.) | 100 | 100 | 100 | 100 |
| Titanium dioxide (pigment grade) | 100 | 100 | 100 | 100 |
| Epocryl E11 (methacrylic acid/epoxy resin "Epon 828" reaction product) |  | 5 |  | 5 |
| Di-(α-cumyl) peroxide |  |  | 2 | 2 |
| Properties at 25° C.: |  |  |  |  |
| Tensile strength, p.s.i. | 1080 | 880 | 1120 | 1300 |
| Elongation, percent | 25 | 25 | 30 | 70 |
| Properties at 100° C.: |  |  |  |  |
| Tensile strength, p.s.i. | 3 | 7 | 7 | 125 |
| Elongation, percent | 20 | 25 | 205 | 420 |
| Peel strength, lbs./inch width | <1 | <1 | 7 | 9 |

Sample Nos. 10 and 14 of Tables II and III, respectively, clearly illustrate the significantly better properties produced by the composition of the present invention.

Tables IV and V illustrate the properties obtained with certain vinyl copolymers. The samples in Table IV and V were prepared and cured in the same manner as set forth for the samples of Table I except that the milling temperature for the Table IV samples ranged from 140–150° C., and the Table V samples were milled at room temperature.

TABLE IV

|  | Sample number (parts by weight) | | | |
| --- | --- | --- | --- | --- |
|  | 15 | 16 | 17 | 18 |
| Ethylene-butene copolymer ("Marlex 5065") | 100 | 100 |  |  |
| Acrylonitrile-butadiene-styrene terpolymer ("Cycolac EP") |  |  | 100 | 100 |
| Crushed quartz ("Min-U-Sil," average particle size 5 microns) | 100 | 100 | 100 | 100 |
| Epocryl E11 (methacrylic acid/epoxy resin "Epon 828" reaction product) | 5 | 5 | 5 | 5 |
| Di-(α-cumyl) peroxide |  | 1 |  | 1 |
| Properties at 25° C.: |  |  |  |  |
| Tensile strength, p.s.i. | 3380 | 3700 | 3020 | 5330 |
| Elongation, percent | <10 | <10 | <10 | <10 |
| Properties at 100° C.: |  |  |  |  |
| Tensile strength, p.s.i. | 1130 | 2200 | 2120 | 2460 |
| Elongation, percent | 20 | 250 | 10 | 10 |

TABLE V

|  | Sample number (parts by weight) | | | |
| --- | --- | --- | --- | --- |
|  | 19 | 20 | 21 | 22 |
| Ethylene-propylene-1,4 hexadiene terpolymer ("Nordel") | 100 | 100 | 100 | 100 |
| Titanium dioxide (pigment grade) | 100 | 100 | 100 | 100 |
| Epocryl E11 (methacrylic acid/epoxy resin "Epon 828" reaction product) |  |  | 5 | 5 |
| Di-(α-cumyl) peroxide |  | 2 |  | 2 |
| Properties at 25° C.: |  |  |  |  |
| Tensile strength, p.s.i. | 80 | 1190 | 65 | 1535 |
| Elongation, percent | 630 | 600 | 310 | 300 |

Sample Nos. 16 and 18 of Table IV, and Sample No. 22 of Table V, show the improved tensile properties of the instant compositions.

In Table VI a mixture of polyvinyl chloride and polyethylene was used. The Table VI samples were prepared and cured in the same manner as set forth for Table I except that polyvinyl chloride, polyethylene and the Epocryl E11 were premilled at a temperature of 140° C. and di(α-cumyl) peroxide was milled into the mixture at a temperature of 120° C.

TABLE VI

|  | Sample number (parts by weight) | | |
| --- | --- | --- | --- |
|  | 23 | 24 | 25 |
| Polyvinyl chloride ("Geon 101") | 50 | 50 | 50 |
| Polyethylene ("Alathon 10," 22,000 mol. wt., 0.923 density at 25° C.) | 50 | 50 | 50 |
| "Epocryl E11" (methacrylic acid/epoxy resin "Epon 828" reaction product) |  | 5 | 10 |
| Di-(α-cumyl) peroxide | 1 | 1 | 1 |
| Properties at 25° C.: |  |  |  |
| Tensile strength, p.s.i. | 1630 | 2830 | 3050 |
| Elongation, percent | 15 | 20 | 20 |
| Properties at 100° C.: |  |  |  |
| Tensile strength, p.s.i. | 250 | 395 | 505 |
| Elongation, percent | 50 | 135 | 165 |

Since a mixture of two distinct polymers was used in Table VI, the good tensile properties shown by Sample Nos. 24 and 25 are significant. The Epocryl E11 in these two samples appeared to improve the compatibility of the two polymers.

In Table VII the samples were prepared and pressed in the same manner as set forth for the samples of Table I except that no peroxide was used. Each pressed sample was irradiated with high energy electrons to a radiation dose of $20 \times 10^6$ rep. The tensile properties of the cured samples were then determined.

TABLE VII

|  | Sample number (parts by weight) | | | |
| --- | --- | --- | --- | --- |
|  | 26 | 27 | 28 | 29 |
| Polyethylene ("Epolene C13," 10,000 mol. wt., 0.921 density at 25° C.) | 100 | 100 |  |  |
| Polyethylene ("Epolene C10," 7000 mol. wt., 0.908 density at 25° C.) |  |  | 100 | 100 |
| Crushed quartz ("Min-U-Sil," average particle size 5 microns) | 100 |  | 100 |  |
| Crushed quartz ("Min-U-Sil," average particle size 10 microns) |  | 100 |  | 100 |
| "Epocryl E11" (methacrylic acid/epoxy resin "Epon 828" reaction product) | 5 | 5 | 5 | 5 |
| Properties at 25° C.: |  |  |  |  |
| Tensile Strength, p.s.i. | 1915 | 1758 | 1385 | 1550 |
| Elongation, percent | 10 | 15 | 10 | 15 |
| Properties at 100° C.: |  |  |  |  |
| Tensile Strength, p.s.i. | 351 | 191 | 54 | 57 |
| Elongation, percent | 100 | 90 | 90 | 113 |

These irradiated compositions are useful for packaging purposes and for making electrically insulating tapes for winding around electrical conductors as insulation. Such irradiated compositions can also be used as slot insulation in motors.

The samples in Table VIII were prepared and cured in the same manner as set forth for the samples of Table I except that the milling temperature was 130° C.

TABLE VIII

|  | Sample number (parts by weight) | |
| --- | --- | --- |
|  | 30 | 31 |
| Ethylene-butene copolymer ("Marlex 5065") | 100 | 100 |
| Titanium dioxide (pigment grade) | 100 | 100 |
| Epocryl E11 (methacrylic acid/epoxy resin "Epon 828" reaction product) |  | 5 |
| Di-(α-cumyl) peroxide | 2 | 2 |
| Properties at 25° C.: |  |  |
| Tensile strength, p.s.i. | 2580 | 2680 |
| Elongation, percent | <10 | 80 |
| Properties at 100° C.: |  |  |
| Tensile strength, p.s.i. | 850 | 1340 |
| Elongation, percent | 40 | 180 |

Sample No. 31 of Table VIII shows the better tensile properties obtained by the instant composition. Specifically, it reflects improved polymer-filler adhesiveness to produce a tougher, more flexible, filled polymer.

In Sample Nos. 32 and 33 of Table IX the liquid reaction product of acrylic acid and an epoxy novolac resin was used.

The novolac resin had an epoxy equivalent of 180 and corresponds to the formula

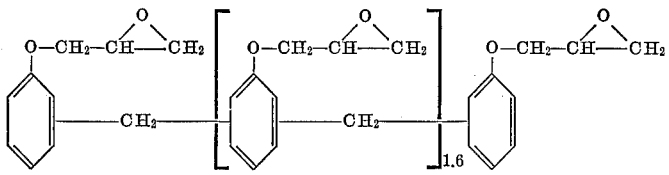

To form the reaction product, 50 grams of the novolac resin were dissolved in 70 grams of toluene. To this solution, there was added 0.1 g. of hydroquinone as a stabilizer and 0.5 g. of pyridine as a basic catalyst. The resulting solution was heated to 80° C. and 20 grams of acrylic acid were added to the hot solution which was then refluxed. At the end of one hour, reflux was stopped, and the toluene was stripped off under vacuum.

Samples 32 and 33 were prepared and cured in the same manner as set forth for the samples of Table I.

TABLE IX

| | Sample number (parts by weight) | |
|---|---|---|
| | 32 | 33 |
| Polyethylene ("Alathon 10," 22,000 mol. wt., 0.923 density at 25° C.) | 40 | |
| 50 parts by wt., polyvinyl chloride (Geon 101)/50 parts by wt., chlorinated polyethylene (25% chlorine) | | 100 |
| Titanium dioxide (pigment grade) | 40 | |
| Acrylic acid/epoxy novolac reaction product | 4 | 5 |
| Di-(α-cumyl) peroxide | 0.8 | 1.0 |
| Properties at 25° C.: | | |
| Tensile strength, p.s.i | 2200 | 2330 |
| Elongation, percent | 27 | 22 |
| Properties at 100 °C.: | | |
| Tensile strength, p.s.i | 740 | 690 |
| Elongation, percent | 110 | 100 |

In Sample No. 34 of Table X, a reaction product of acrylic acid and an epoxidized olefin having an epoxy equivalent of 153.8 was used.

The epoxidized polyolefin was a dicyclohexane diepoxide carboxylate (Unox Epoxide 201) having the formula $$O(C_6H_8)(CH_3)CH_2OCO(C_6H_8)(CH_3)O$$

To form the reaction product, 103 grams of the dicyclohexane diepoxide carboxylate were mixed with 200 grams of anhydrous benzene. To this there was added 0.2 g. of hydroquinone as a stabilizer and 1.0 g. of pyridine as a basic catalyst. This mixture was heated to 85° C. and 73 grams of acrylic acid were added to the hot solution which was then heated at 85° C. for one hour. At the end of this time, heating was stopped, and the benzene was stripped off under vacuum. Infrared analysis of the reaction product showed the presence of acrylic groups with only a small percentage of epoxy groups remaining.

Sample No. 34 was prepared and cured in the same manner as set forth for the samples of Table I.

TABLE X

| | Sample number 34 (parts by weight) |
|---|---|
| Polyethylene ("Alathon 10," 22,000 mol. wt., 0.923 density at 25° C.) | 40 |
| Titanium dioxide (pigment grade) | 40 |
| Acrylic acid/dicyclohexane diepoxide carboxylate reaction product | 4 |
| Di-(α-cumyl) peroxide | 0.8 |
| Properties at 25° C.: | |
| Tensile strength, p.s.i. | 2110 |
| Elongation, percent | 67 |
| Properties at 100° C.: | |
| Tensile strength, p.s.i. | 778 |
| Elongation, percent | 190 |

In Samples Nos. 35 and 36 of Table XI, "Epocryl E11," the reaction product used in Sample No. 1 was used. Samples Nos. 35 and 36 were prepared and cured in the same manner as set forth for the samples of Table I except that the polyvinyl chloride and the Epocryl E11 were premilled at a temperature of 140° C. and di(α-cumyl) peroxide was milled into the mixture at a temperature of 120° C.

TABLE XI

| | Sample number (parts by weight) | |
|---|---|---|
| | 35 | 36 |
| Polyvinyl chloride (Geon 101) | 100 | 100 |
| Epocryl E11 (methacrylic acid/epoxy resin "Epon 828" reaction product) | | 10 |
| Di-(α-cumyl) peroxide | 1 | 1 |
| Properties at 25° C.: | | |
| Tensile strength, p.s.i | 8060 | 8950 |
| Elongation, percent | 21 | 28 |
| Properties at 100° C.: | | |
| Tensile strength, p.s.i | 630 | 1190 |
| Elongation, percent | 106 | 229 |

Samples Nos. 37 and 38 of Table XII were prepared and cured in the same manner as set forth for the samples of Table I except that the milling temperature was 135° C.

TABLE XII

| | Sample number (parts by weight) | |
|---|---|---|
| | 37 | 38 |
| Polyethylene ("Marlex 5002," 0.950 density, melt index 0.2) | 100 | 100 |
| Epocryl E11 (methacrylic acid/epoxy resin "Epon 828" reaction product) | | 10 |
| Di-(α-cumyl) peroxide | 1 | 1 |
| Properties at 25° C.: | | |
| Tensile strengt, p.s.i | 4526 | 5222 |
| Elongation, percent | 343 | 300 |
| Properties at 100° C.: | | |
| Tensile strength, p.s.i | 1873 | 2272 |
| Elongation, percent | 320 | 400 |

What we claim as new and desire to secure by Letters Patent of the United States is:

1. A curable composition comprising on a weight basis 100 parts of a vinyl polymer selected from the group consisting of polyethylene, polyvinyl chloride, polyvinylidene chloride, polypropylene, polyisobutylene, polystyrene, ethylene-propylene copolymer, ethylene-propylene-butylene copolymer, ethylene-butene copolymer, acrylonitrile-butadiene - styrene terpolymer, ethylene-propylene-1,4-hexadiene terpolymer, chlorinated polyethylene and mixtures thereof, and 0.1 to 50 parts of the reaction product of an unsaturated monocarboxylic acid corresponding to the formula

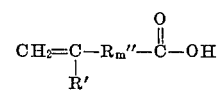

where R' is a monovalent radical selected from the group consisting of hydrogen, an alkyl radical of from 1 to 8 carbon atoms, halogen, and an aromatic radical, R" is a divalent saturated aliphatic hydrocarbon radical of from 1 to 3 carbon atoms and $m$ is 0 or 1, the amount of said acid used to form said reaction product ranging from not less than 50 percent of the stoichiometric amount up to approximately equivalent stoichiometric proportions, and an epoxy resin selected from the group consisting of polyglycidyl ethers of polyhydric phenols and epoxidized olefins, wherein the epoxy equivalent weight is in the range 100 to 4000 and which contains more than one 1,2-epoxy group per molecule.

2. A curable composition according to claim 1 wherein the epoxy resin corresponds to the general formula

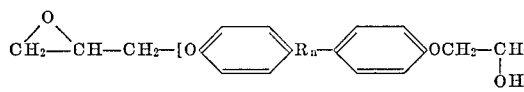

where R is a divalent radical selected from the group consisting of a saturated alkylene radical of from 1 to 8 carbon atoms, oxygen and the sulfone group, $y$ is 0 or an integer having a value up to 25 and $n$ is 0 or 1.

3. A curable composition according to claim 1 wherein the epoxy resin corresponds to the formula

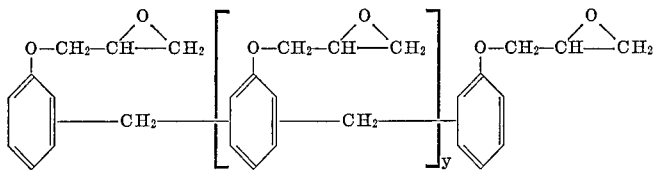

where $y$ is 0 or an integer having a value up to 25.

4. A curable composition according to claim 1 wherein the epoxy resin corresponds to the formula

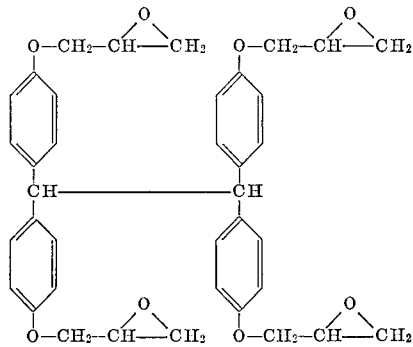

5. A curable composition according to claim 1 wherein the epoxy resin corresponds to the formula $$O(C_6H_8)(CH_3)CH_2OCO(C_6H_8)(CH_3)O$$

6. A cured composition formed by subjecting the comsition of claim 1 to a source of free radicals.

7. A cured composition according to claim 7 wherein the source of free radicals is an organic peroxide.

8. A cured composition according to claim 7 wherein the source of free radicals is provided by ionizing radiation.

9. A cured composition according to claim 8 which includes a filler.

10. A cured composition according to claim 9 which includes a filler.

11. A composition comprising on a weight basis 100 parts of polyethylene, 0.1 to 50 parts of the reaction product of methacrylic acid and an epoxy resin, said epoxy resin being formed from epichlorohydrin and 2,2-bis(p-hydroxyphenyl) propane and having an epoxide equivalent of 185–192, and an organic peroxide.

12. A composition comprising on a weight basis 100 parts of ethylene-butene copolymer, 0.1 to 50 parts of the reaction product of methacrylic acid and an epoxy resin, said epoxy resin being formed from epichlorohydrin and 2,2-bis(p-hydroxyphenyl) propane and having an epoxide equivalent of 185–192, and an organic peroxide.

13. A composition comprising on a weight basis 100 parts of acrylonitrile-butadiene-styrene terpolymer, 0.1 to 50 parts of the reaction product of methacrylic acid and an epoxy resin, said epoxy resin being formed from epichlorohydrin and 2,2-bis(p-hydroxyphenyl) propane and having an epoxide equivalent of 185–192, and an organic peroxide.

14. A composition comprising on a weight basis 100 parts of ethylene-propylene-1,4-hexadiene terpolymer, 0.1 to 50 parts of the reaction product of methacrylic acid and an epoxy resin, said epoxy resin being formed from epichlorohydrin and 2,2-bis(p-hydroxyphenyl) propane and having an epoxide equivalent of 185–192, and an organic peroxide.

15. A curable composition comprising on a weight basis 100 parts of a polymer blend comprised of 20–95 parts of a vinyl polymer and 5–80 parts of a second vinyl polymer, said vinyl polymers being selected from the group consisting of polyethylene, polyvinyl chloride, polyvinylidene chloride, polypropylene, polyisobutylene, polystyrene, ethylene-propylene copolymer, ethylene-propylene-butylene copolymer, ethylene-butene copolymer, acrylonitrile-butadiene-styrene terpolymer, ethylene-propylene-1,4 hexadiene terpolymer, and chlorinated polyethylene, and 0.1 to 50 parts of the reaction product of an unsaturated monocarboxylic acid corresponding to the formula

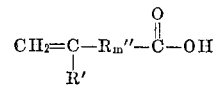

where R′ is a monovalent radical selected from the group consisting of hydrogen, an alkyl radical of from 1 to 8 carbon atoms, halogen, and an aromatic radical, R″ is a divalent saturated aliphatic hydrocarbon radical of from 1 to 3 carbon atoms and $m$ is 0 or 1, the amount of said acid used to form said reaction product ranging from not less than 50 percent of the stoichiometric amount up to approximately equivalent stoichiometric proportions, and an epoxy resin selected from the group consisting of polyglycidyl ethers of polyhydric phenols and epoxidized olefins, wherein the epoxy equivalent weight is in the range 100 to 4000 and which contains more than one 1,2-epoxy group per molecule.

16. A cured composition formed by subjecting the composition of claim 15 to a source of free radicals.

17. A process for producing a cured composition which comprises providing, on a weight basis, a mixture of 100 parts of a vinyl polymer selected from the group consisting of polyethylene, polyvinyl chloride, polyvinylidene chloride, polypropylenes, polyisobutylene, polystyrene, ethylene-propylene copolymer, ethylene-propylene-butylene copolymer, ethylene-butene copolymer, acrylonitrile-butadiene-styrene terpolymer, ethylene-propylene-1,4 hexadiene terpolymer, chlorinated polyethylene and mixtures thereof, 0.1 to 50 parts of the reaction product of an unsaturated monocarboxylic acid corresponding to the formula

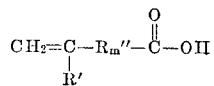

where R' is a monovalent radical selected from the group consisting of hydrogen, an alkyl radical of from 1 to 8 carbon atoms, halogen, and an aromatic radical, R'' is a divalent saturated aliphatic hydrocarbon radical of from 1 to 3 carbon atoms and $m$ is 0 or 1, the amount of said acid used to form said reaction product ranging from not less than 50 percent of the stoichiometric amount up to approximately equivalent stoichiometric proportions, and an epoxy resin selected from the group consisting of polyglycidyl ethers of polyhydric phenols and epoxidized olefins, wherein the epoxy equivalent weight is in the range 100 to 4000 and which contains more than one 1,2-epoxy group per molecule, and 0.1 to 5 parts of a curing agent, and heating the mixture at a temperature sufficiently high to cure it.

18. A process according to claim 17 wherein the epoxy resin corresponds to the general formula

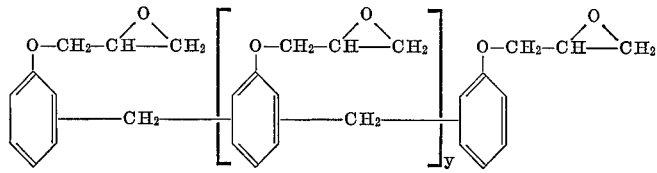

where R is a divalent radical selected from the group consisting of an alkyl radical of from 1 to 8 carbon atoms, an oxygen atom, and a sulfone group, $y$ is 0 or an integer having a value up to 25 and $n$ is 0 or 1.

19. A process according to claim 17 wherein the epoxy resin corresponds to the formula

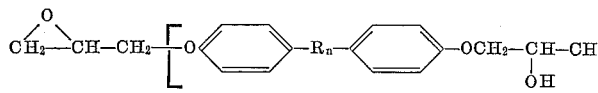

where $y$ is 0 or an integer having a value up to 25.

20. A process according to claim 17 wherein the epoxy resin corresponds to the formula

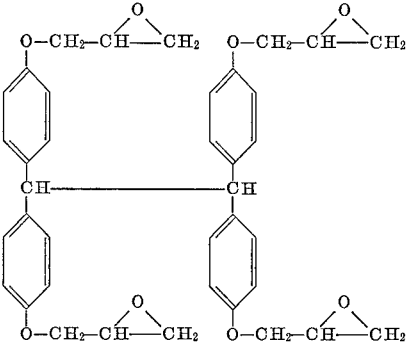

21. A process according to claim 17 wherein the epoxy resin corresponds to the formula $$O(C_6H_8)(CH_3)CH_2OCO(C_6H_8)(CH_3)O$$

22. A curable composition according to claim 1 wherein said vinyl polymer is polyethylene.

23. A curable composition according to claim 1 wherein said vinyl polymer is polyvinyl chloride.

24. A curable composition according to claim 1 wherein said vinyl polymer is a mixture of polyvinyl chloride and polyethylene.

25. A curable composition according to claim 1 wherein said vinyl polymer is a mixture of polyvinyl chloride and chlorinated polyethylene.

References Cited

UNITED STATES PATENTS 3,301,743  1/1967  Fekete _____ 260—837

PAUL LIEBERMAN, Primary Examiner

U.S. Cl. X.R.

161—186; 260—2, 37, 41, 47, 836